United States Patent
Sugizaki (10) Patent No.: US 12,078,610 B2
(45) Date of Patent: Sep. 3, 2024

(54) CHEMICAL SENSOR DEVICE AND CHEMICAL SENSOR MODULE

(71) Applicant: KABUSHIKI KAISHA TOSHIBA, Tokyo (JP)

(72) Inventor: Yoshiaki Sugizaki, Fujisawa Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 497 days.

(21) Appl. No.: 17/402,220

(22) Filed: Aug. 13, 2021

(65) Prior Publication Data

US 2022/0276198 A1 Sep. 1, 2022

(30) Foreign Application Priority Data

Mar. 1, 2021 (JP) ................................. 2021-031382

(51) Int. Cl.
*G01N 27/414* (2006.01)
*B01L 3/00* (2006.01)

(52) U.S. Cl.
CPC ........ *G01N 27/4145* (2013.01); *B01L 3/5023* (2013.01); *G01N 27/4141* (2013.01); *B01L 2300/0636* (2013.01); *B01L 2300/0663* (2013.01); *B01L 2300/069* (2013.01); *B01L 2400/0406* (2013.01)

(58) Field of Classification Search
CPC ............ G01N 27/4145; G01N 27/4141; B01L 3/5023
See application file for complete search history.

(56) References Cited

U.S. PATENT DOCUMENTS

2020/0086323 A1    3/2020  Hongo et al.
2021/0080416 A1*   3/2021  Sugizaki .......... G01N 33/54373

FOREIGN PATENT DOCUMENTS

| JP | H8-254516 A | 10/1996 |
| JP | H11-183335 A | 7/1999 |
| JP | 2000-35397 A | 2/2000 |
| JP | 2006-138731 A | 6/2006 |
| JP | 2007-40757 A | 2/2007 |
| JP | 2009-294051 A | 12/2009 |
| JP | 2020-46263 A | 3/2020 |
| JP | 2021-47051 A | 3/2021 |

* cited by examiner

*Primary Examiner* — Brian Gangle
*Assistant Examiner* — Lakia J Jackson-Tongue
(74) *Attorney, Agent, or Firm* — Finnegan, Henderson, Farabow, Garrett & Dunner, LLP (57) ABSTRACT

A chemical sensor device includes a substrate; a chemical sensor element formed on the substrate and including a sensor surface exposed to mist; and a first water-absorbing member provided around the sensor surface on the substrate and including an opening that exposes the sensor surface.

7 Claims, 7 Drawing Sheets

CHEMICAL SENSOR DEVICE AND CHEMICAL SENSOR MODULE

CROSS-REFERENCE TO RELATED APPLICATION

This application is based upon and claims the benefit of priority from Japanese Patent Application No. 2021-031382, filed on Mar. 1, 2021; the entire contents of which are incorporated herein by reference.

FIELD

Embodiments described herein relate generally to a chemical sensor device and a chemical sensor module.

BACKGROUND

A chemical sensor device detecting gas-phase chemical substances in the liquid phase is known.

DETAILED DESCRIPTION

According to one embodiment, a chemical sensor device includes a substrate; a chemical sensor element formed on the substrate and including a sensor surface exposed to mist; and a first water-absorbing member provided around the sensor surface on the substrate and including an opening that exposes the sensor surface.

Hereinafter, the embodiments will be described with reference to the drawings as appropriate. For the convenience of explanation, the scale of each drawing is not always accurate and may be indicated by a relative positional relationship or the like. Further, the same or similar elements are designated by the same reference numerals.

Figure 1:
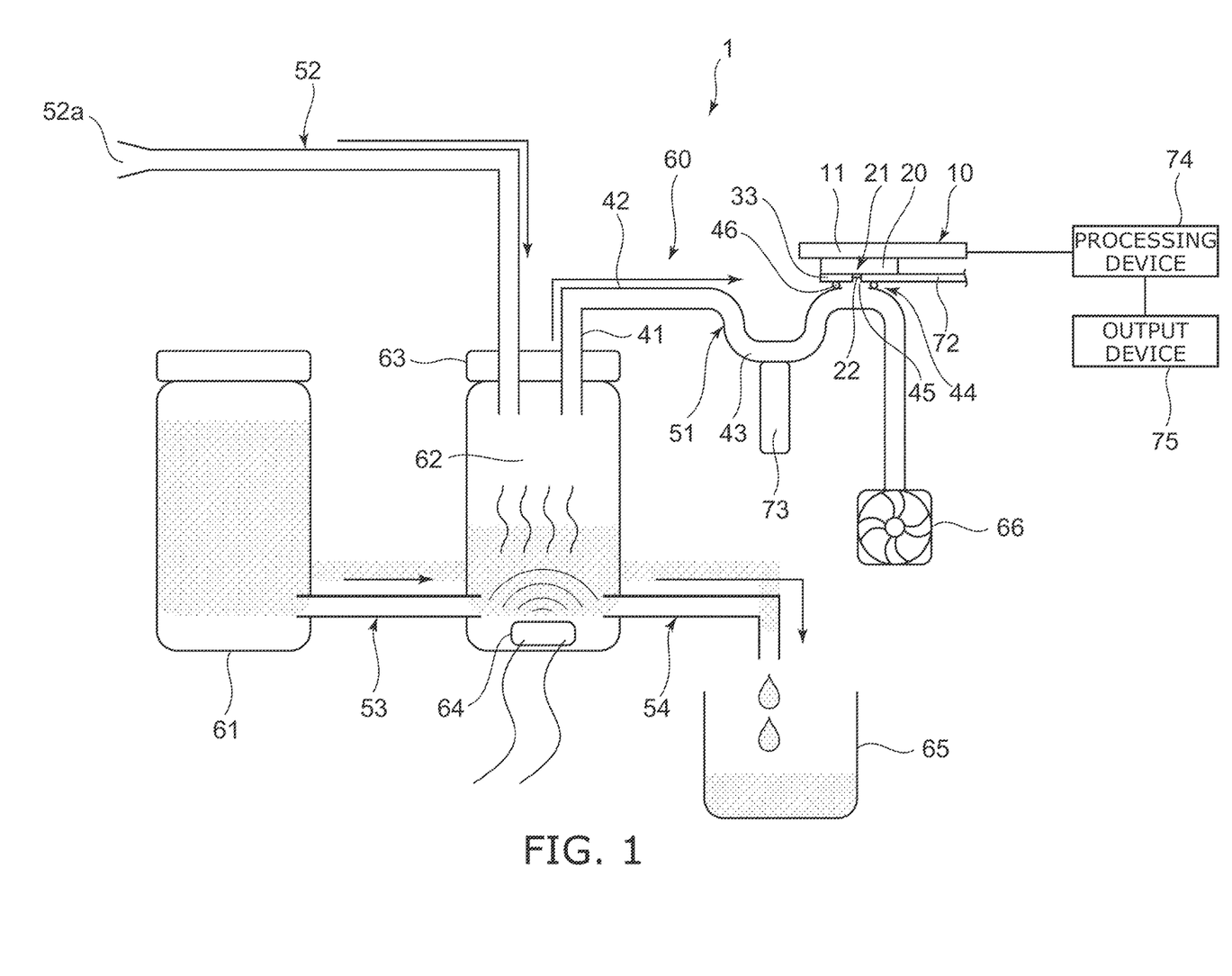
FIG. 1 is a schematic view showing a configuration of a chemical sensor module of an embodiment.

FIG. 1 is a schematic view showing the configuration of a chemical sensor module 1 of an embodiment.

The chemical sensor module 1 of the embodiment includes a mist supply mechanism 60. The mist supply mechanism 60 includes a mist generation chamber 62, a second pipe 52 that supplies a sample atmosphere to the mist generation chamber 62, an ultrasonic transmitter 64 disposed in the mist generation chamber 62, and a first pipe 51 through which mist in which the sample atmosphere is incorporated flows.

The first pipe 51 includes a sensor mounting portion 44 on which a chemical sensor element 21 is mounted. The sensor mounting portion 44 includes an opening 45 that exposes a sensor surface 22 of the chemical sensor element 21 to the inside of the first pipe 51.

Figure 2:
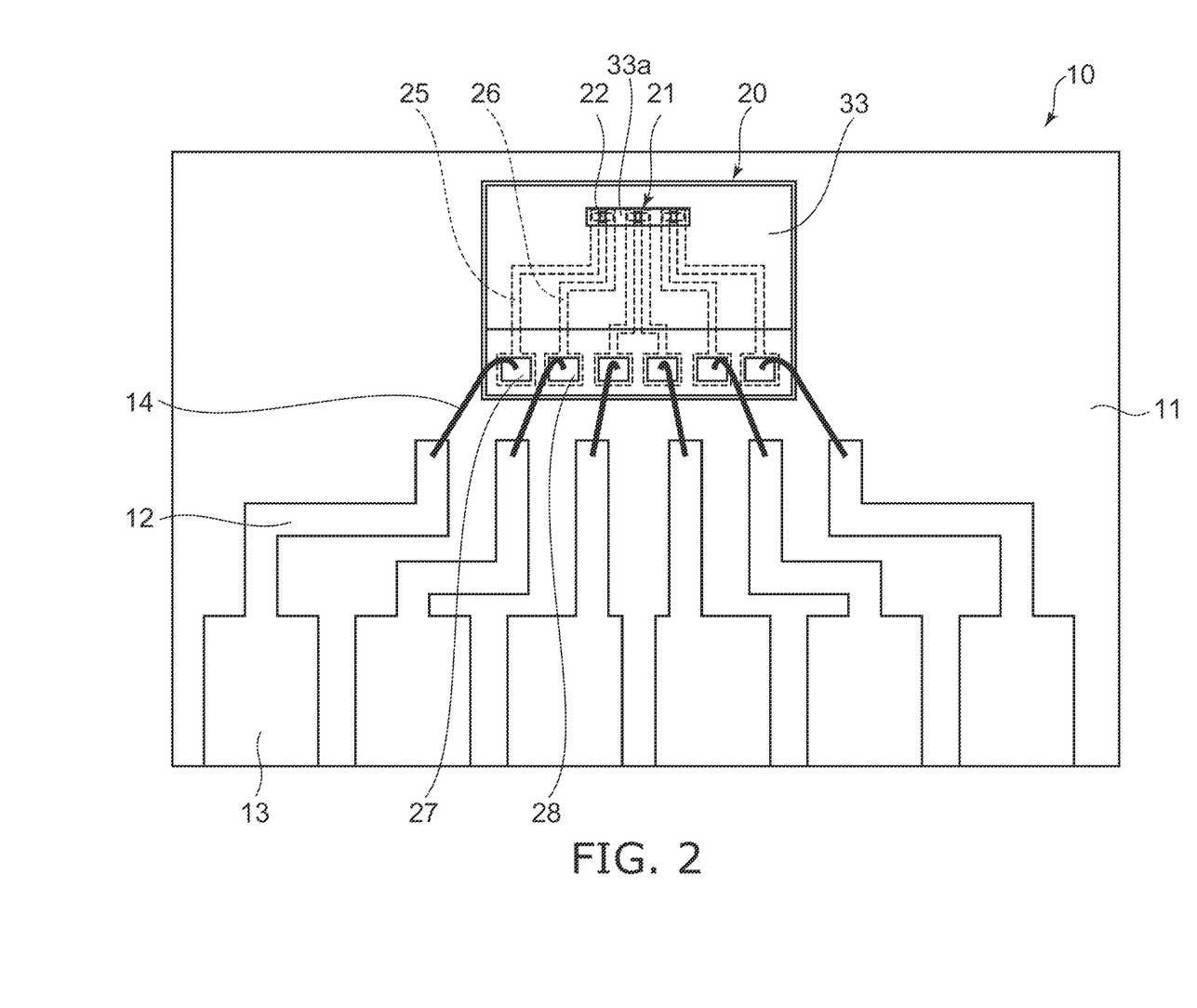
FIG. 2 is a schematic view showing a configuration of a chemical sensor device of the embodiment.

FIG. 2 is a schematic view showing the configuration of a chemical sensor device 10 including the chemical sensor element 21.

The chemical sensor device 10 includes a cartridge board 11 and a sensor chip 20 mounted on the cartridge board 11.

Figure 3:
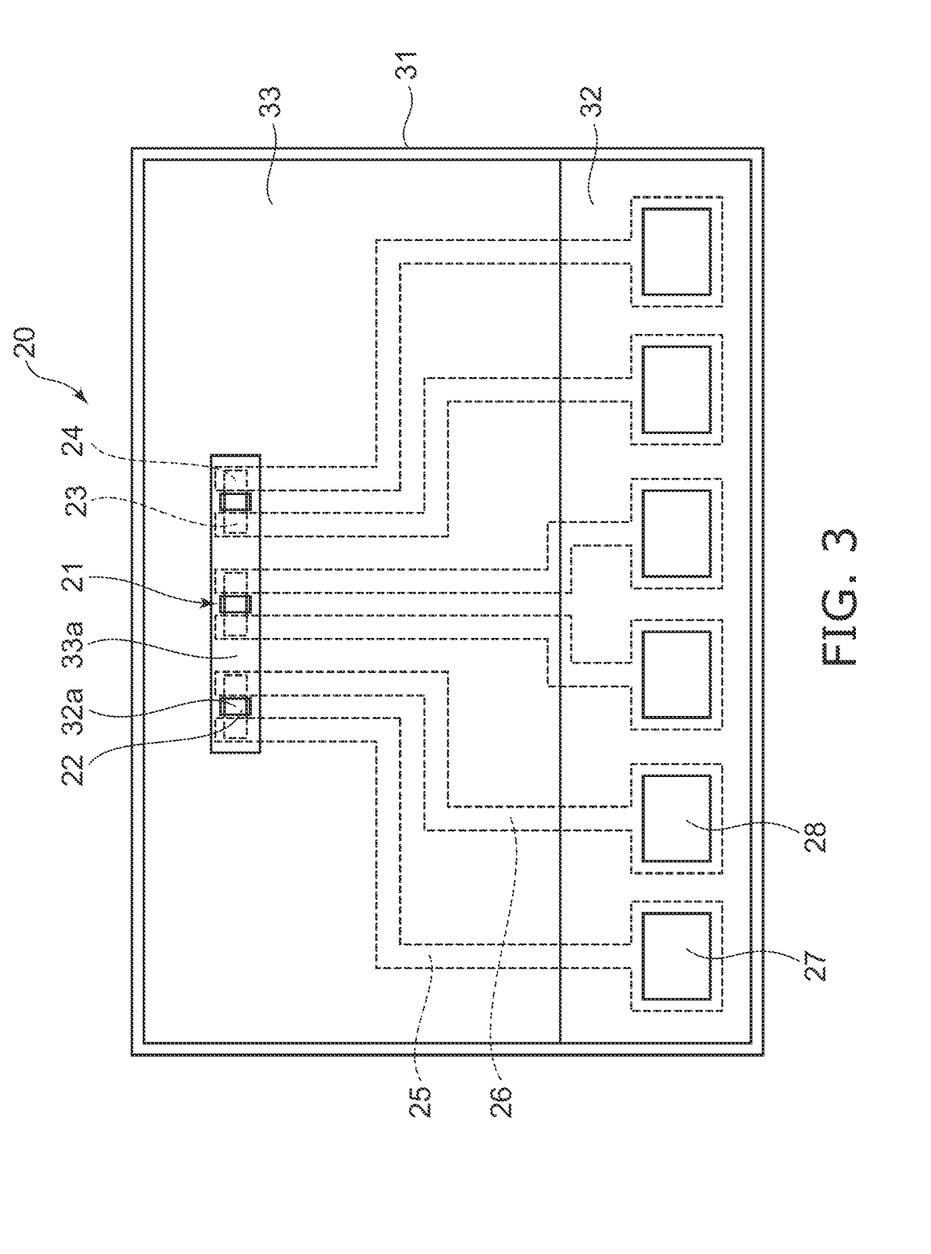
FIG. 3 is a schematic view showing a configuration of a sensor chip of the embodiment.

FIG. 3 is a schematic view showing the configuration of the sensor chip 20.

Figure 4:
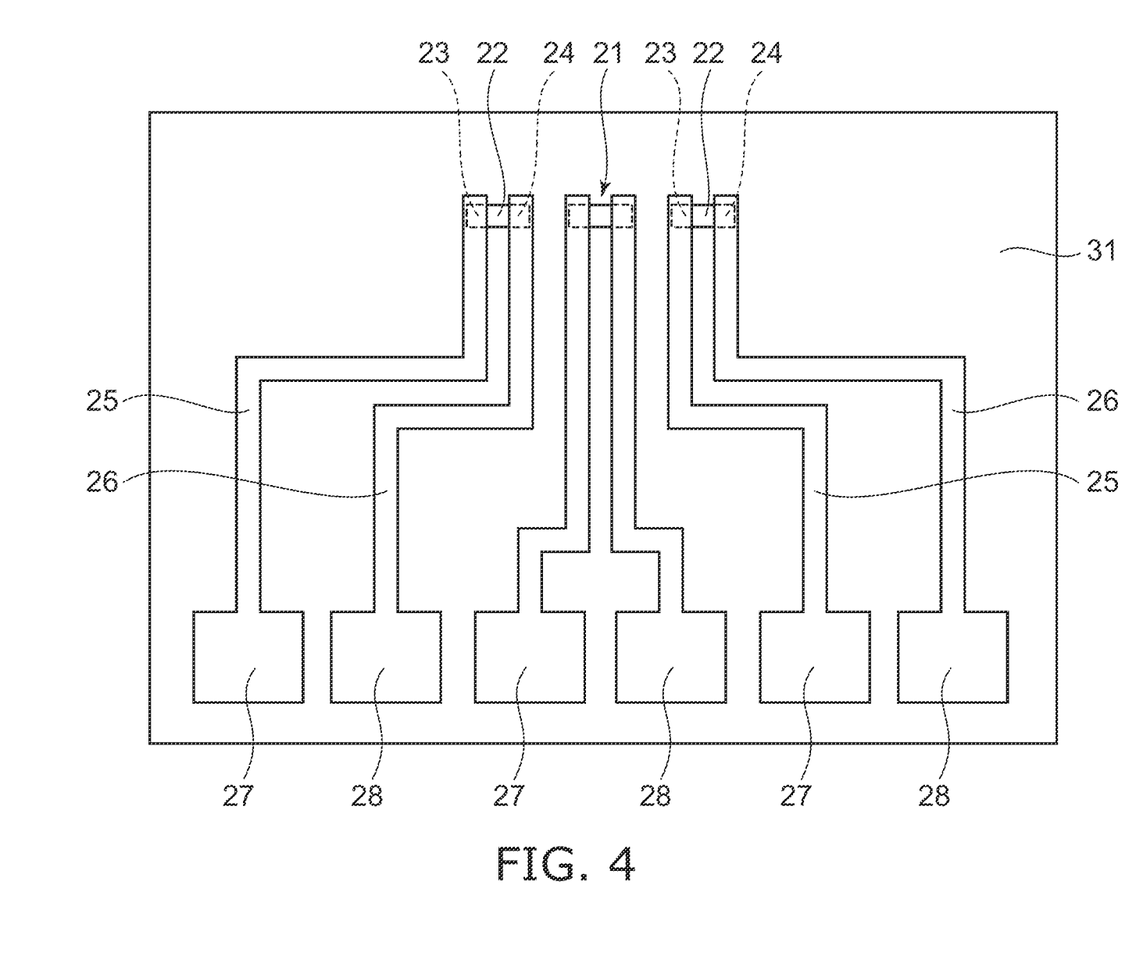
FIGS. 4 and 5 are schematic views showing a partial configuration of the sensor chip of the embodiment.
Figure 5:
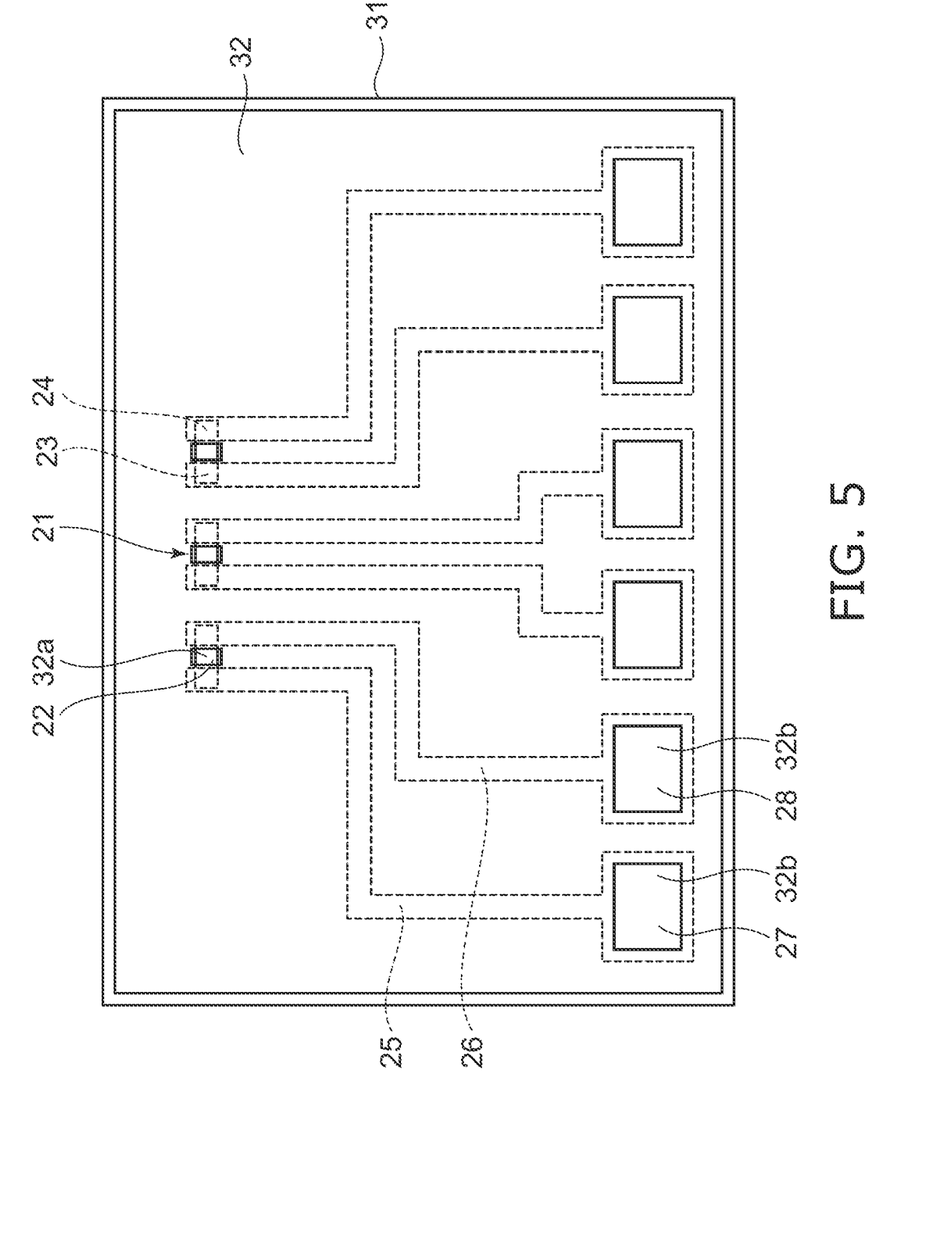

FIGS. 4 and 5 are schematic views showing a partial configuration of the sensor chip 20.

The sensor chip 20 includes a chip substrate 31, the chemical sensor element 21, and a first water-absorbing member 33.

The chip substrate 31 is, for example, a silicon substrate. For example, a silicon oxide film is formed on the surface of the silicon substrate. As shown in FIG. 4, the chemical sensor element 21 is formed on the chip substrate 31. The number of chemical sensor elements 21 formed on the chip substrate 31 may be plural or one.

The chemical sensor element 21 is, for example, a charge detection element containing graphene or carbon nanotubes. The chemical sensor element 21 includes the sensor surface 22 exposed to the mist in which a sample atmosphere is incorporated, a drain electrode 24, and a source electrode 23.

On the chip substrate 31, a metal wiring 26 connected to the drain electrode 24, a metal wiring 25 connected to the source electrode 23, an electrode terminal 27 connected to the metal wiring 25, and an electrode terminal 28 connected to the metal wiring 26 are formed.

After forming the elements shown in FIG. 4 on the chip substrate 31, an insulating protective film 32 shown in FIG. 5 is formed on the chip substrate 31 to cover the elements. The protective film 32 includes an opening 32a that exposes the sensor surface 22 of the chemical sensor element 21, and openings 32b that expose the surfaces of the electrode terminals 27 and 28.

As shown in FIG. 3, the first water-absorbing member 33 is formed on the protective film 32. The first water-absorbing member 33 is provided on the chip substrate 31 at least around the sensor surface 22 and includes an opening 33a that exposes the sensor surface 22. The surfaces of the electrode terminals 27 and 28 are exposed from the first water-absorbing member 33. The first water-absorbing member 33 is, for example, a non-woven fabric of cellulose or glass fiber.

The chemical sensor element 21 may further include probe molecules fixed to the sensor surface 22. For example, the probe molecule binds to either methyl benzoate or an ecgonine derivative. Alternatively, the probe molecule binds to terpenes. For example, terpenes are caryophyllene derivatives.

The sensor chip 20 shown in FIG. 3 is mounted on the cartridge board 11 shown in FIG. 2. A cartridge wiring 12 and a contact terminal 13 connected to the cartridge wiring 12 are formed on the cartridge board 11.

The electrode terminals 27 and 28 of the sensor chip 20 and the cartridge wiring 12 are connected by, for example, a metal wire 14. Therefore, the chemical sensor element 21 is electrically connected to the contact terminal 13 via the metal wirings 25 and 26, the electrode terminals 27 and 28, the metal wire 14, and the cartridge wiring 12.

The chemical sensor element 21 is attached to the sensor mounting portion 44 as shown in FIG. 1. The sensor mounting portion 44 includes the opening 45 that exposes the inside of the first pipe 51 to the outside.

Figure 6:
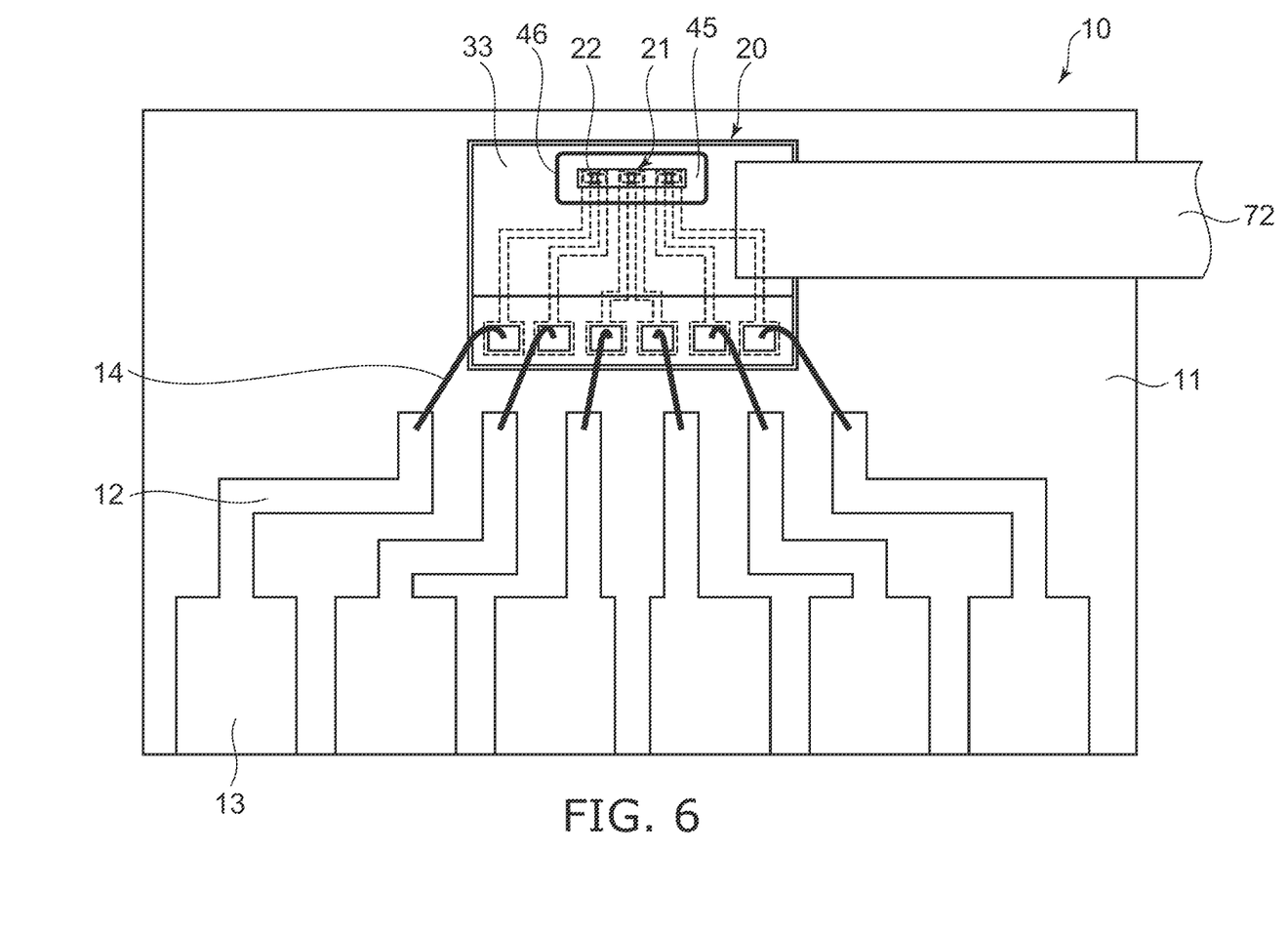
FIG. 6 is a schematic view showing an arrangement relationship between the chemical sensor device and a sensor mounting portion in the embodiment.

The chemical sensor element 21 is detachable and attachable to the sensor mounting portion 44. FIG. 6 is a schematic view showing the arrangement relationship between the chemical sensor device 10 and the sensor mounting portion.

The sensor surface 22 exposed from the first water-absorbing member 33 is aligned with the opening 45 of the sensor mounting portion 44 and the sensor surface 22 is exposed inside the first pipe 51 through the opening 45. As shown in FIG. 1, a seal member 46 is interposed around the opening 45 between the chemical sensor device 10 and the first pipe 51. The peripheral portion of the sensor surface 22 of the sensor chip 20 is in close contact with the seal member 46.

Further, the first water-absorbing member 33 of the sensor chip 20 is in close contact with a second water-absorbing member 72 provided on the sensor mounting portion 44. As the second water-absorbing member 72, the same material as the first water-absorbing member 33 can be used. The second water-absorbing member 72 extends from a connection portion with the first water-absorbing member 33 on the sensor chip 20 to the outside of the sensor chip 20 and further to the outside of the cartridge board 11.

The contact terminal 13 formed on the cartridge board 11 is connected to a processing device 74 via a socket or a probe.

One end of the first pipe 51 penetrates a top plate 63 that closes the upper part of the mist generation chamber 62 and is connected to the inside of the mist generation chamber 62. For example, an intake fan 66 is connected to the other end of the first pipe 51 as an intake device.

An atmosphere collection port 52a is formed at one end of the second pipe 52. The other end of the second pipe 52 penetrates the top plate 63 and is connected to the inside of the mist generation chamber 62.

The chemical sensor module 1 further includes a sample solution supply tank 61 for storing a liquid (sample solution) for generating mist, a third pipe 53 connecting the sample solution supply tank 61 and the mist generation chamber 62, a drainage tank 65, and a fourth pipe 54 connecting the drainage tank 65 and the mist generation chamber 62.

The sample solution is, for example, water or a buffer. A new sample solution is supplied from the sample solution supply tank 61 into the mist generation chamber 62 via the third pipe 53. The sample solution in the mist generation chamber 62 can be discharged to the drainage tank 65 via the fourth pipe 54.

The chemical sensor module 1 further includes a discharge mechanism for discharging droplets condensed on the inner wall of the first pipe 51. The first pipe 51 includes a U-shaped curved portion 43 between one end connected to the inside of the mist generation chamber 62 and the sensor mounting portion 44 in which the opening 45 is formed. The bottom of the curved portion 43 is located at a position lower than the opening 45. The discharge mechanism includes a third water-absorbing member 73 provided at the bottom of the curved portion 43. As the third water-absorbing member 73, the same material as the first water-absorbing member 33 can be used.

The first pipe 51 includes a first portion 41 extending from the inside of the mist generation chamber 62 through the top plate 63 and above the mist generation chamber 62, and a second portion 42 connecting the first portion 41 and the curved portion 43. The second portion 42 is located at a position higher than the curved portion 43.

The chemical sensor module 1 further includes the processing device 74 that is electrically connected to the chemical sensor element 21 and processes information detected by the chemical sensor element 21, and an output device 75 that outputs processing results and the like of the processing device 74. The output device 75 is, for example, a display device, a speaker, or the like.

Next, the operation of the chemical sensor module 1 of the embodiment will be described.

By driving the intake fan 66, the sample atmosphere is taken into the second pipe 52 from the atmosphere collection port 52a of the second pipe 52. The sample atmosphere is introduced into the mist generation chamber 62 from the second pipe 52.

A sample solution (for example, water or a buffer) is supplied into the mist generation chamber 62, and the mist of the sample solution is generated in the mist generation chamber 62 by driving the ultrasonic transmitter 64 disposed in the mist generation chamber 62. The size of the mist is, for example, several μm or more and several tens of μm or less.

The sample atmosphere and mist are mixed in the mist generation chamber 62. Chemical substances in the sample atmosphere are incorporated into the mist. The mist in which the chemical substances are incorporated is conveyed from the mist generation chamber 62 into the first pipe 51 by the drive of the intake fan 66 and reaches the sensor mounting portion 44.

The sensor surface 22 of the chemical sensor element 21 exposed in the first pipe 51 through the opening 45 in the sensor mounting portion 44 is exposed to the mist in which the chemical substances are incorporated. For example, the electrical characteristics of the sensor surface 22 change when a specific substance (target substance) incorporated into the mist associates with the probe molecule fixed on the sensor surface 22. Due to the change in electrical characteristics, the chemical sensor element 21 detects the specific substance (target substance).

When incorporating a target substance into the liquid phase, for example, a sparingly soluble target substance tends to segregate at the interface between the liquid phase and another phase (gas phase or solid phase). When the liquid phase is mist, a sparingly soluble target substance segregates on the surface of the mist. That is, if the mist is used, the surface area of the liquid phase in which the target substance is to be incorporated can be increased, and the target substance can be efficiently incorporated into the liquid phase. Further, the mist is conveyed in the air in the first pipe 51 to the sensor mounting portion 44 and is unlikely to segregate on the inner wall of the first pipe 51. Therefore, according to the embodiment, the detection sensitivity of the target substance by the chemical sensor element 21 can be increased.

Further, the mist aggregates on the inner wall of the first pipe 51, and droplets that are larger in size than the mist and whose size cannot be controlled are condensed on the inner wall of the first pipe 51. When the droplets flow through the inner wall of the first pipe 51 and reach the sensor surface 22, it becomes noise with respect to the detection signal of the chemical sensor element 21.

According to the embodiment, since the first water-absorbing member 33 is provided around the sensor surface 22, the droplets that have flowed through the inner wall of the first pipe 51 fall on the first water-absorbing member 33 instead of falling on the sensor surface 22 and are absorbed. Therefore, noise with respect to the detection signal of the chemical sensor element 21 can be reduced.

By forming the first water-absorbing member 33 in advance on the chip substrate 31 of the sensor chip 20 by patterning, the sensor surface 22 and the opening 33*a* that exposes the sensor surface 22 can be easily aligned. Since the second water-absorbing member 72 extending outside the sensor chip 20 is connected to the first water-absorbing member 33 on the sensor chip 20, the moisture absorbed by the first water-absorbing member 33 can be further absorbed by the second water-absorbing member 72 and discharged from the sensor chip 20.

Further, the first pipe 51 is provided with the U-shaped curved portion 43 and the bottom of the curved portion 43 is locally lower than the other portions in the first pipe 51. Further, the third water-absorbing member 73 is provided at the bottom of the curved portion 43 and a part of the third water-absorbing member 73 is exposed inside the first pipe 51 at the bottom of the curved portion 43. Therefore, the droplets condensed on the inner wall of the first pipe 51 can be collected at the bottom of the curved portion 43 and absorbed by the third water-absorbing member 73. As a result, it is possible to prevent the droplets condensed on the inner wall of the first pipe 51 from flowing to the sensor surface 22.

Further, when the droplets in which the target substance is incorporated flow from the first pipe 51 into the mist generation chamber 62 and mix with the sample solution, the target substance is concentrated in the sample solution, which leads to false detection of the target substance by the chemical sensor element 21 or deterioration of detection accuracy. According to the embodiment, since the droplets condensed on the inner wall of the first pipe 51 can be discharged from the inside of the first pipe 51 by the third water-absorbing member 73, the droplets in which the target substance is incorporated can also be prevented from flowing down into the mist generation chamber 62.

Further, since a new sample solution can be supplied from the sample solution supply tank 61 to the mist generation chamber 62 via the third pipe 53 and the old sample solution in the mist generation chamber 62 can be drained through the fourth pipe 54 to the drainage tank 65, it is possible to prevent the concentration of the target substance in the sample solution in the mist generation chamber 62.

Figure 7:
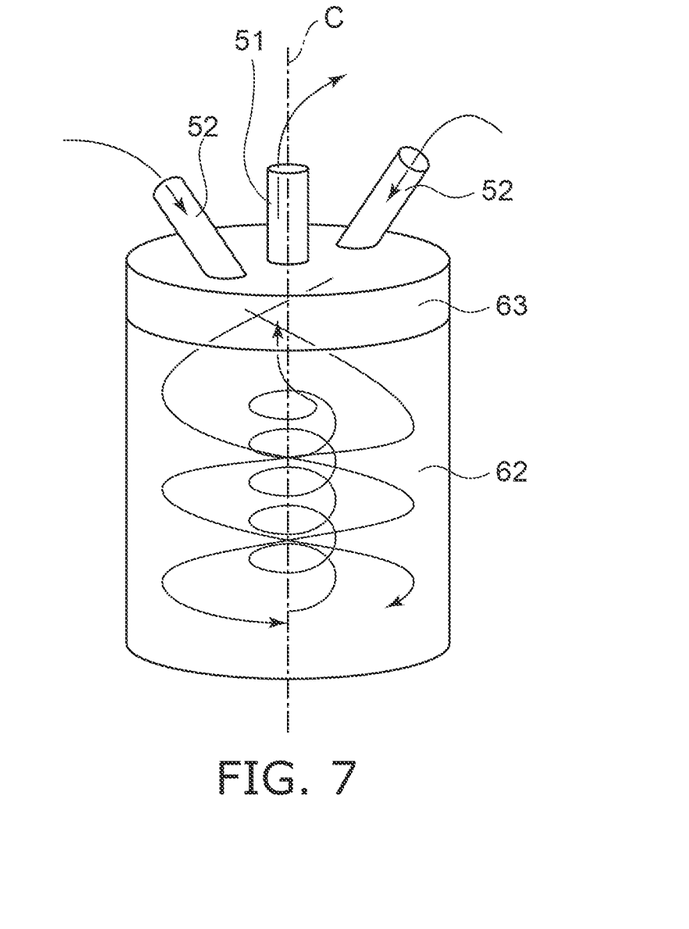
FIG. 7 is a schematic view of a mist supply mechanism of a chemical sensor module of the embodiment.

As shown in FIG. 7, for example, the outer shape of the mist generation chamber 62 is cylindrical and the horizontal cross-section of the mist generation chamber 62 is circular. The first pipe 51 is connected from the upper surface of the mist generation chamber 62 along the central axis C of the mist generation chamber 62. The first pipe 51 penetrates the center of the top plate 63 having a circular shape in the top view. In such a configuration, a plurality of (for example, two) second pipes 52 can be inclined with respect to the central axis C and connected to the mist generation chamber 62 from the upper surface. The first pipe 51 is located between the two second pipes 52 in the top view. For example, the inclination angle of the second pipe 52 with respect to the central axis C is 10° or more and 80° or less.

The sample atmosphere introduced into the mist generation chamber 62 from the two second pipes 52 inclined with respect to the central axis C forms an airflow that rotates around the central axis C in the mist generation chamber 62. Then, the mist mixed with the sample atmosphere also forms a flow that rotates around the central axis C and flows into the first pipe 51. As a result, the stirring effect between the sample atmosphere and the mist is enhanced in the mist generation chamber 62 and the target substance in the sample atmosphere can be efficiently incorporated into the mist.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modification as would fall within the scope and spirit of the inventions.

What is claimed is:

1. A chemical sensor device comprising:
a substrate;
a chemical sensor element formed on the substrate and including a sensor surface exposed to mist; and
a first water-absorbing member provided around the sensor surface on the substrate and including an opening that exposes the sensor surface,
the chemical sensor element further including probe molecules fixed to the sensor surface.

2. The device according to claim 1, wherein
the first water-absorbing member is a non-woven fabric of cellulose or glass fiber.

3. The device according to claim 1, wherein the probe molecule binds to either methyl benzoate or an ecgonine derivative.

4. The device according to claim 1, wherein the probe molecule binds to terpenes.

5. The device according to claim 4, wherein
the terpenes are caryophyllene derivatives.

6. A chemical sensor device comprising:
a substrate;
a chemical sensor element formed on the substrate and including a sensor surface exposed to mist;
a first water-absorbing member provided around the sensor surface on the substrate and including an opening that exposes the sensor surface; and
a cartridge board, wherein a sensor chip including the substrate, the chemical sensor element, and the first water-absorbing member is mounted on the cartridge board.

7. The device according to claim 6, further comprising:
a second water-absorbing member connected to the first water-absorbing member on the sensor chip.

* * * * *